(12) United States Patent
Nakada

(10) Patent No.: US 7,133,387 B2
(45) Date of Patent: Nov. 7, 2006

(54) RANDOM ACCESS CONTROL METHOD FOR CDMA SYSTEM

(75) Inventor: Suguru Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 852 days.

(21) Appl. No.: 09/832,094

(22) Filed: Apr. 11, 2001

(65) Prior Publication Data

US 2001/0043582 A1 Nov. 22, 2001

(30) Foreign Application Priority Data

May 18, 2000 (JP) ............... 2000-146752

(51) Int. Cl.
*H04B 7/216* (2006.01)
*H04J 3/06* (2006.01)

(52) U.S. Cl. .................. 370/335; 370/329; 370/516

(58) Field of Classification Search ............... 370/468, 370/335, 328–330, 344, 348, 342, 437, 441, 370/461, 320, 350, 508, 516, 519; 455/434–435.3, 455/450–451, 452.1–2, 430, 442, 512, 456.1, 455/509, 464

See application file for complete search history.

(56) References Cited

U.S. PATENT DOCUMENTS 6,751,465 B1 * 6/2004 Nakada ............... 455/512

2001/0008524 A1 * 7/2001 Ishii et al. ............... 370/335
2001/0041573 A1 * 11/2001 Ishii et al. ............... 455/450

FOREIGN PATENT DOCUMENTS

| EP | 0760564 A2 | 3/1997 |
|----|-----------|--------|
| EP | 0 978 950 A2 | 2/2000 |
| EP | 0 982 871 A2 | 3/2000 |
| JP | 3-6932 | 1/1991 |
| JP | 5-227124 A | 9/1993 |
| JP | 7-87091 A | 3/1995 |
| JP | 8-167885 | 6/1996 |
| JP | 10-42343 A | 2/1998 |
| JP | 10-178386 | 6/1998 |
| JP | 2000-59850 | 2/2000 |

* cited by examiner

*Primary Examiner*—Afsar Qureshi
(74) *Attorney, Agent, or Firm*—Sughrue Mion, PLLC (57) ABSTRACT

An object of the present invention is to provide an efficient channel access method on the base of propagation delay times in a random access system. The access control method of the present invention for CDMA system wherein a base station is connected with a plurality of mobile stations by the random access is characterized in that the base station stores the propagation delay time of the preamble signal into a memory unit, when the base station transmits a rejection signal for rejecting a communication toward the mobile station which transmits the preamble signal. Further, the base station transmits a allowance signal for allowing a communication toward the mobile station of which propagation delay time is substantially equal to that stored in the memory in the base station.

12 Claims, 6 Drawing Sheets

RANDOM ACCESS CONTROL METHOD FOR CDMA SYSTEM

BACKGROUND OF THE INVENTION

1. Technical Field of the Invention

The present invention relates to a method and circuit for controlling channels in random accesses by using preamble signals under CDMA in order to allocate efficiently access channels particularly for mobile communication systems.

2. Description of the Prior Art

A control channel is independent upon a communication channel in the conventional mobile communication system. A base station controls mobile stations through the control channels, when a call occurs. Here, a plurality of base stations is provided in a wide service area. Further, a common frequency is used for the communication channels for zones which are distant enough to neglect interference noises. Thus, frequency resource is used efficiently.

The frequency may also be common for the control channel in the zones which are distant enough to neglect interference noises.

In JP 3-6932 A (1991), the mobile station transmits a control signal of which header designates an object base station. On the other hand, the base station transmits a free channel signal for allowing the mobile station to transmit the control signal and an identifer for the base station. When the identifier is identical with that transmitted by the mobile station, the base station stops transmitting the free channel signal, thereby knowing immediately whether or not the mobile station stays in its zone. Thus, the channel is efficiently controlled.

Further, in JP 8-167885, a pseudo carrier pulse is transmitted into a radio channel network, by determining whether any carrier is transmitted or not. Further, a channel number for a data packet is confirmed, and channel allocation is controlled, when a plurality of communication terminals uses a channel competitively. Further, data items from the communication terminals are determined and two-stepped priorities are set up on the basis of the determination result.

Figure 6:
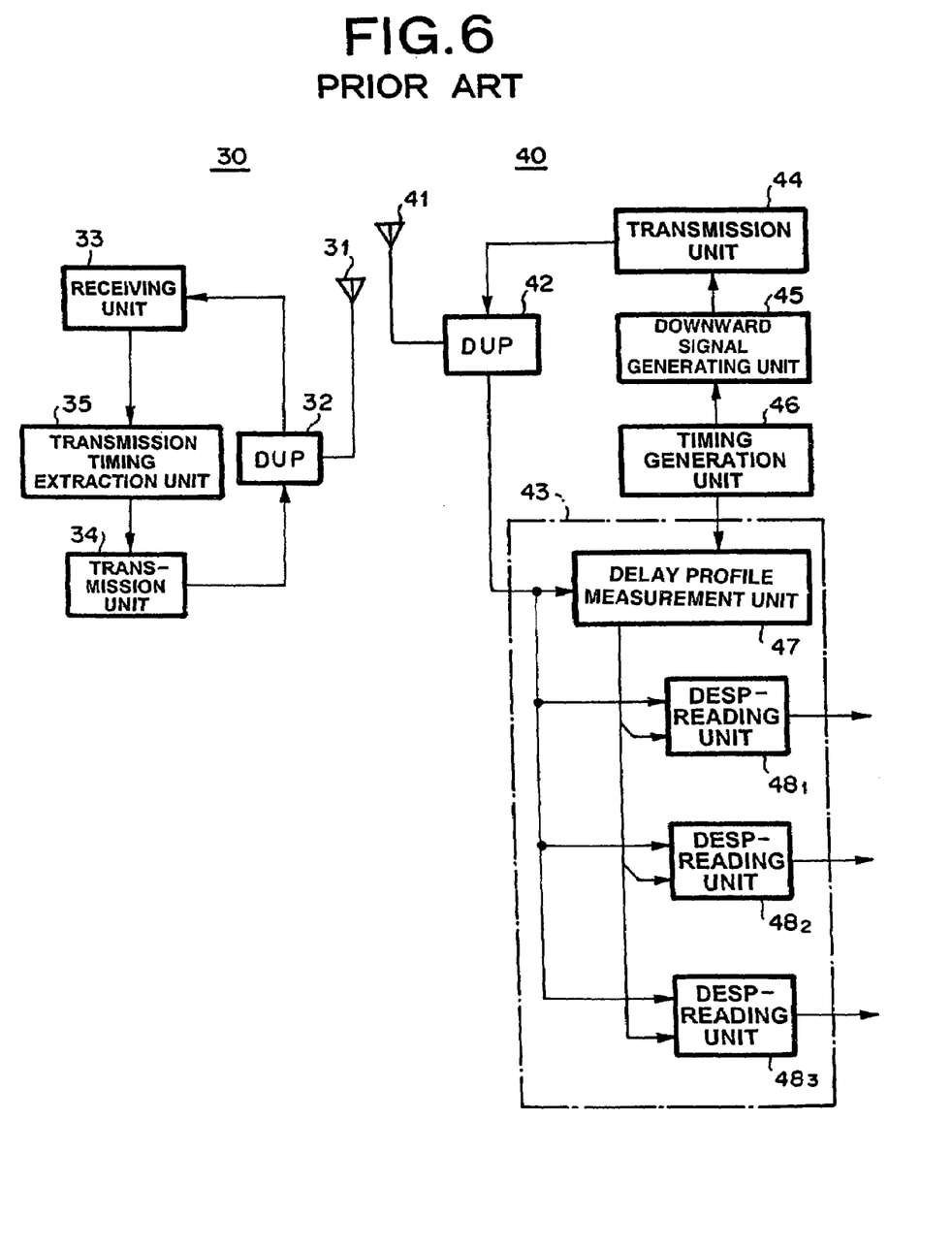
FIG. 6 is a block diagram of a conventional random access CDMA system.

Further, in JP 10-178386 A (1998), transmission management unit 44 as shown in FIG. 6 modulates packets with a preamble and data generated by down stream signal generation unit 45. The modulated packets are transmitted through duplexer 42 by antenna 41, in a random access CDMA system. A down stream standard signal which is as long as the preamble may also be transmitted.

Communication terminal 30 receives the down stream standard signal through antenna 31 and duplexer 32 by using receiving unit 33. The downstream standard signal is detected by transmission timing pickup unit 35, thereby executing the random access by using transmission unit 34 on the basis of detected transmission timing signal.

Delay profile measurement unit 47 in base station 40 calculates a correlation between the preamble and a pseudo-noise code in order to obtain a delay profile in the basis of cyclic addition for reducing noises. The timing signal outputted from delay profile measurement unit 47 is inputted into despreading management units $48_1 \sim 48_3$ which demodulates the received signal by despreading it by using the pseudo-noise code synchronized with the timing signal.

Thus, RAKE reception can be executed by the outputs from despreading management units $48_1 \sim 48_3$, when the packet with preamble and data is modulated by a short period pseudo-noise. On the other hand, when the packet is modulated by a long period pseudo-noise in the slotted ALOHA system, the delay time can be estimated, the synchronous timing can be acquired, thereby reducing transmission power, separating long delay profiles, and executing the random access.

Further, in JP 2000-59850 A, an additional bandwidth is allocated fairly and efficiently in a cellular communication system for transmitting and receiving data burst between mobile stations.

Furthermore, the conventional CDMA mobile communication system includes a random access system which uses upward random access link channel, or RACH (random access channel).

Figure 5:
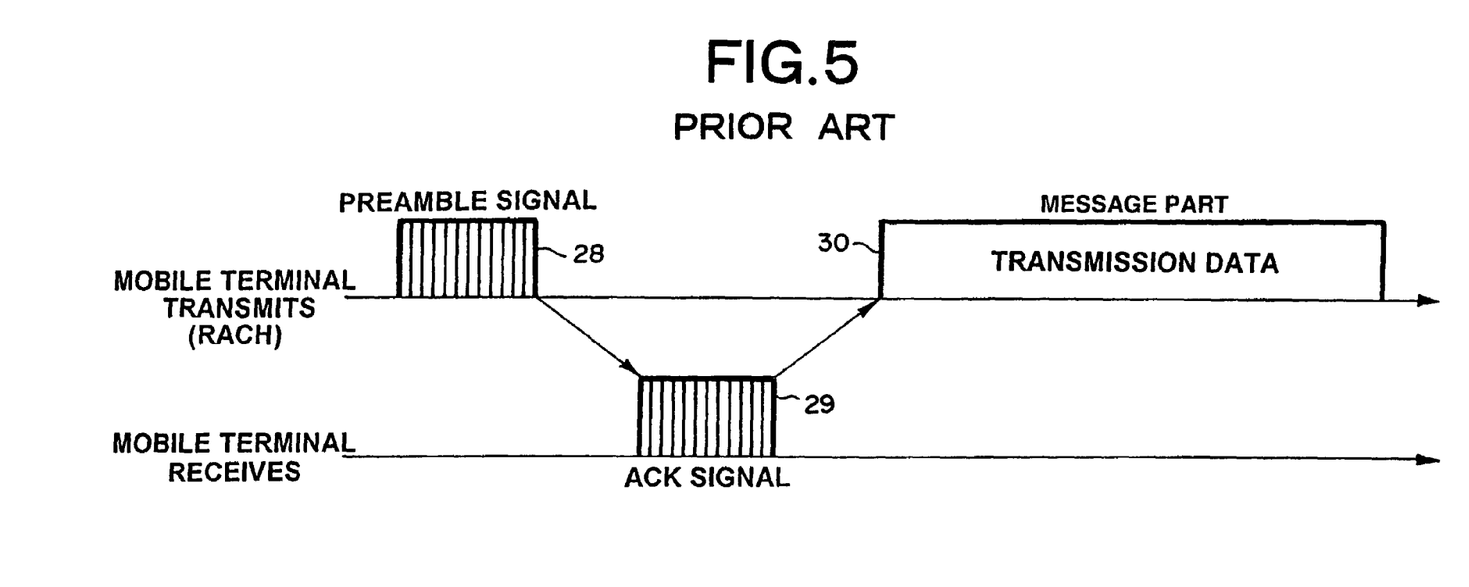
FIG. 5 is a frame structure in a conventional random access CDMA system.

RACH as shown in FIG. 5 comprises preamble signal 28 and message part 30. Message part 30 is used for transmitting actual information, while preamble signal 28 is used for a request signal for obtaining the message part from a mobile station. In other words, preamble signal is used by mobile stations for requesting a right of using the message part which are commonly used by all the mobile stations.

Therefore, the base station has to allocate the finite message part resource, when a plurality of mobile stations request simultaneously the right of using the message part. In this case, one or more mobile stations are rejected inevitably in the random access system. Therefore, it is desirable to give a priority to the mobile station which was once rejected, in order to avoid a long time wait of that mobile station which was once rejected.

Accordingly, the base station may store the identifiers of the once rejected mobile stations, compare the identifiers with the calling mobile stations, and give a priority to the mobile station of which identifier is stored in the base station. The simplest identifier may be the preamble signal, because its length is constant. However, the preamble can not always be used in every CDMA mobile communication system. For example, the preambles of RACH in W-CDMA expectedly introduced in the year 2001 are only ten or more. The mobile station selects randomly one preamble among the ten or more preambles, when the mobile station transmits the preamble. Therefore, the base station can not identify the mobile station by such preambles. Accordingly, another kind of identifier is required.

The propagation delay time is employed in the present invention, because the propagation delay time depending upon a position and environment of the mobile station is measured correctly in the CDMA system and therefore useful to identify the mobile station.

SUMMARY OF THE INVENTION

An object of the present invention is to control efficiently the channel access on the basis of the propagation delay time.

The access method of the present invention for CDMA system wherein a base station is connected with a plurality of mobile stations by the random access is characterized in that the base station stores the propagation delay time of the preamble signal into a memory unit, when the base station transmits a rejection signal for rejecting a communication toward the mobile station which transmits the preamble signal.

Further, the base station transmits an allowance signal for allowing a communication toward the mobile station of which propagation delay time is equal to that stored in the memory in the base station.

The base station apparatus of the present invention comprises a receiving unit for receiving the preamble signal and transmission data from the base station which receives the allowance signal, a correlation unit for calculating a correlation between a plurality of prescribed standard preamble signal and a base band signal outputted from the receiving unit, a preamble signal determination unit for determining whether the base station transmits the rejection signal or the allowance signal on the basis of the correlation and the propagation delay time, a code generation unit for generating the rejection signal or the allowance signal on the basis of the determination result, and a transmission unit for transmitting the rejection signal or the allowance signal.

In short, the present invention provides an efficient control for a random access by preamble signal in CDMA (code division multiple access) system for mobile communication.

According to the present invention, the base station which controls random accesses from a plurality of communication terminals gives a priority to the once rejected terminal which requests the access again, as long as there is any available message part. Therefore, the maximum waiting time for obtaining a message part can be reduced, thereby easing a heavy traffic wherein calls are not connected for however long time the calls are requested.

PREFERRED EMBODIMENT OF THE INVENTION

Figure 1A:
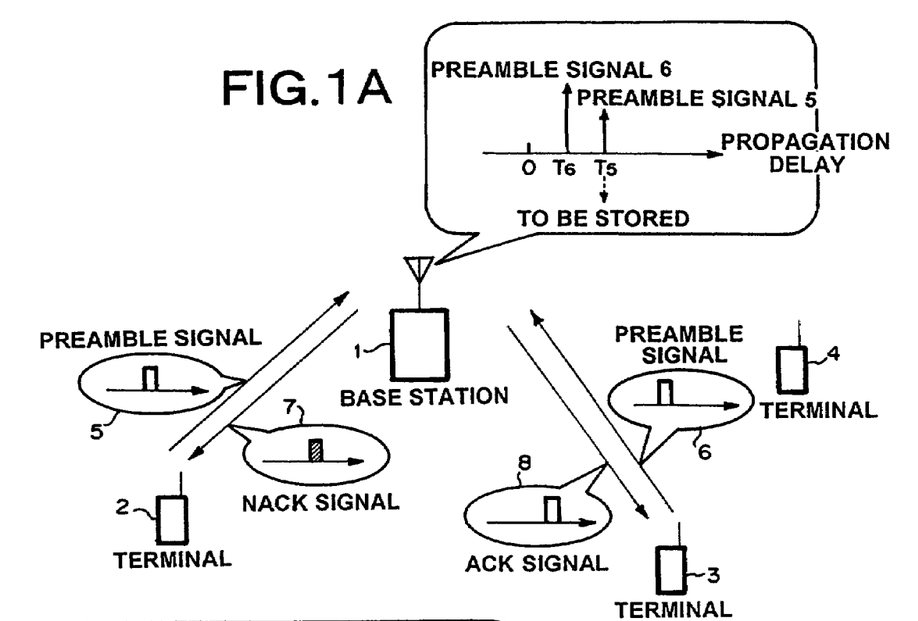
FIGS. 1A and 1B are illustrations of the CDMA system of the present invention.
Figure 1B:
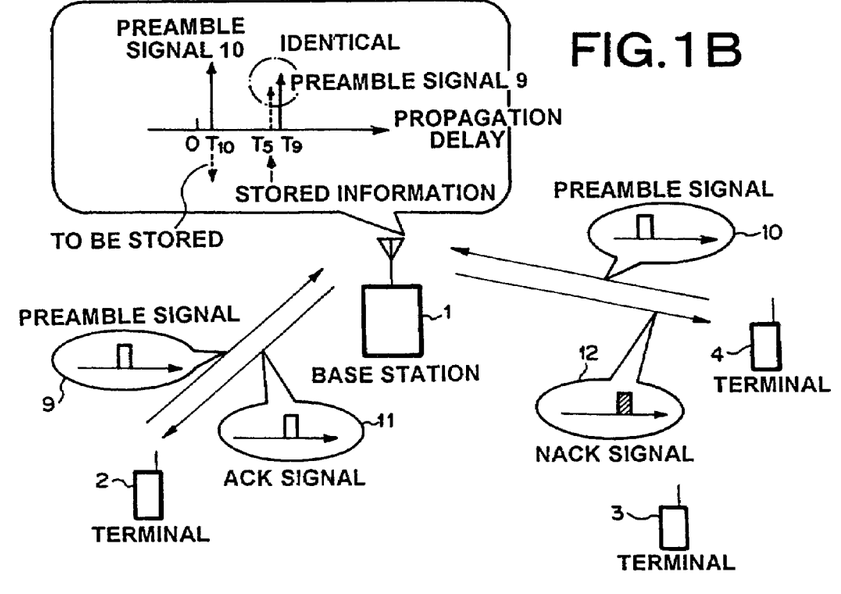

The embodiment as shown in FIGS. 1A and 1B is a CDMA mobile communication system wherein communication terminals 2, 3 and 4 transmit the preamble signals consisting of a plurality of codes for obtaining the message part.

Transmitter/receiver of base station 1 in the base station is provided with memory means for storing the propagation delay times of the preamble signals, together with other units in the conventional base station 40 as shown in FIG. 6. Transmitter/receiver of base station 1 receives the preamble signals from a plurality of communication terminals 2 to 4, and transmits the allowance signal (ACK signal), or the rejection signal (NACK signal), on the basis of each preamble signal.

A plurality of preamble signals which are used commonly by the communication terminals are prescribed beforehand. However, any specific preamble is not prescribed for each mobile station. Further, every time the communication terminal transmits a preamble, the preamble is not the same as that used at the last occasion. Therefore, transmitter/receiver of base station 1 in the base station can not identify the communication terminal merely by analyzing the signal sequence of the preamble.

Figure 2:
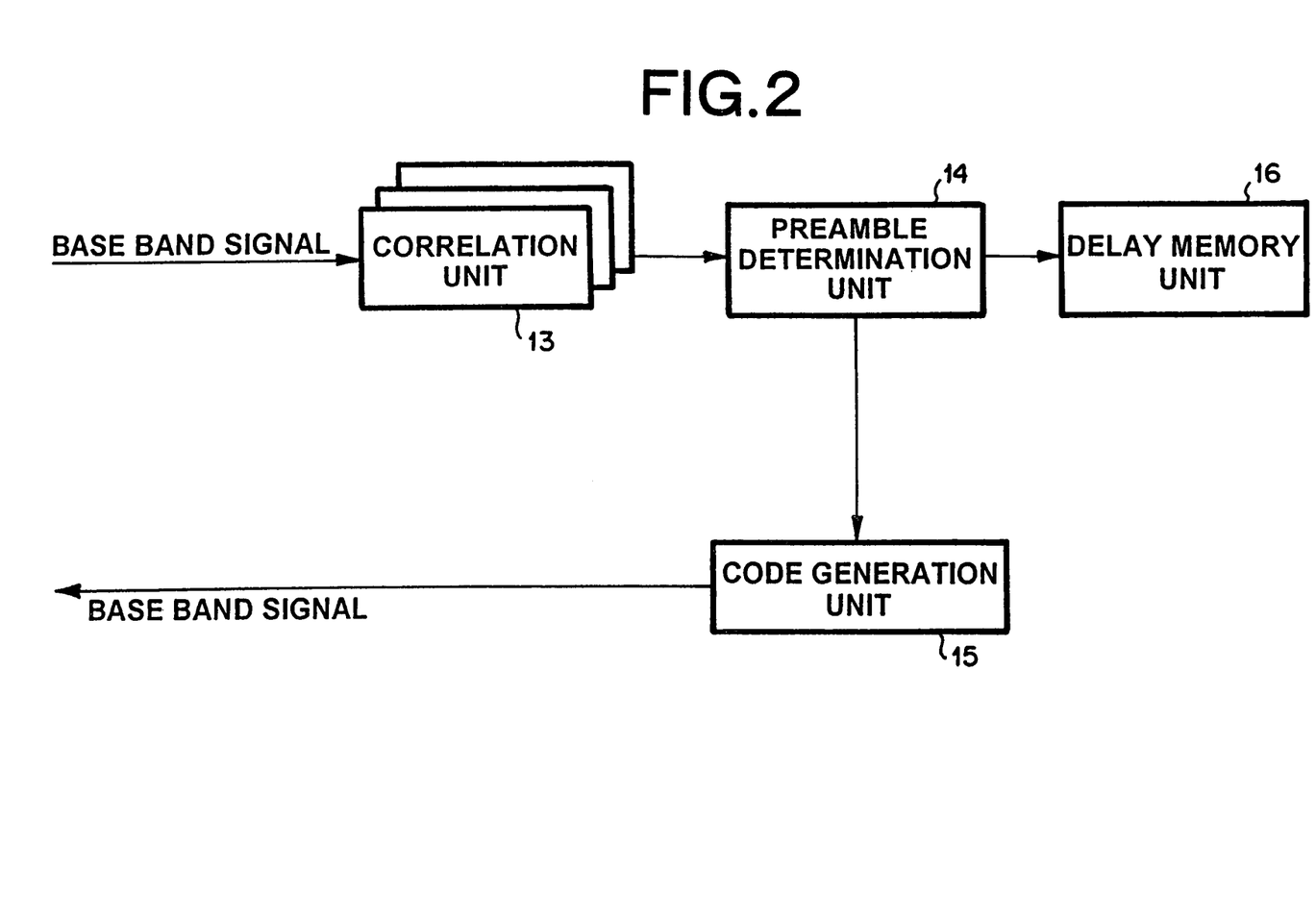
FIG. 2 is a block diagram of a part of the base station in the CDMA system of the present invention.

FIG. 2 is a block diagram of a channel access unit in transmitter/receiver of base station 1 as shown in FIG. 1. A base band signal demodulated by a demodulator is inputted into correlation unit 13, while a base band signal before being modulated by a modulator is outputted from code generation unit 15. Correlation unit 13 comprises a despreading unit for despreading a spread spectrum signal and a transmission channel estimation unit for estimating a transmission channel of the received signal which propagates via a plurality of transmission channels.

Correlation unit 13 calculates correlations between preamble signals selected among a plurality of prescribed preamble signals and a despread base band signal, and then outputs the correlation values and the propagation delay times. Here, the number of prescribed preamble signals may be sixteen, and the prescribed preamble signal may be a pseudo noise code for spread spectrum system. Ordinarily, a signal with a preamble rarely reaches simultaneously together with other signal with that preamble. However, it is important to avoid any collision. The number of correlation units 13 is the number of the mobile stations covered by a base station or the number of the mobile stations which are prescribed and can be received by a base station. Correlation unit 13 obtains a propagation delay time of a preamble signal on the basis of a delay profile which is a graph of signal level versus delay time. For example, the delay time may be a shift of the received preamble from the stored preamble.

Preamble determination unit 14 determines whether a preamble was received or not, and then determines whether ACK should be transmitted or NACK should be transmitted. Only one preamble determination may be employed, even when a plurality of correlation units 13 is employed. The output from correlation unit 13, or an information pair of a mobile station transmitting a preamble and a delay time of that preamble, is stored if necessary by preamble determination unit 14.

Code generation unit 15 generates ACK signal or NACK signal on the basis of the output from preamble determination unit 14 and outputs the ACK signal or the NACK signal toward the modulator in the transmission unit. Delay memory unit 16 stores for a prescribed time period the delay time of the preamble signal for which the NACK signal is replied. Delay memory unit 16 may be a one chip SRAM, one chip DRAM, or a plurality of registers.

The combination of correlation unit 13 and preamble determination unit 14 as shown in FIG. 2 is a part of delay profile measurement unit 47 as shown in FIG. 6, while delay memory unit 16 as shown in FIG. 2 is a memory of delay profile measurement unit 47. The timing signal from timing generation unit 46 as shown in FIG. 6 is inputted into correlation unit 13 as shown in FIG. 2.

Figure 3:
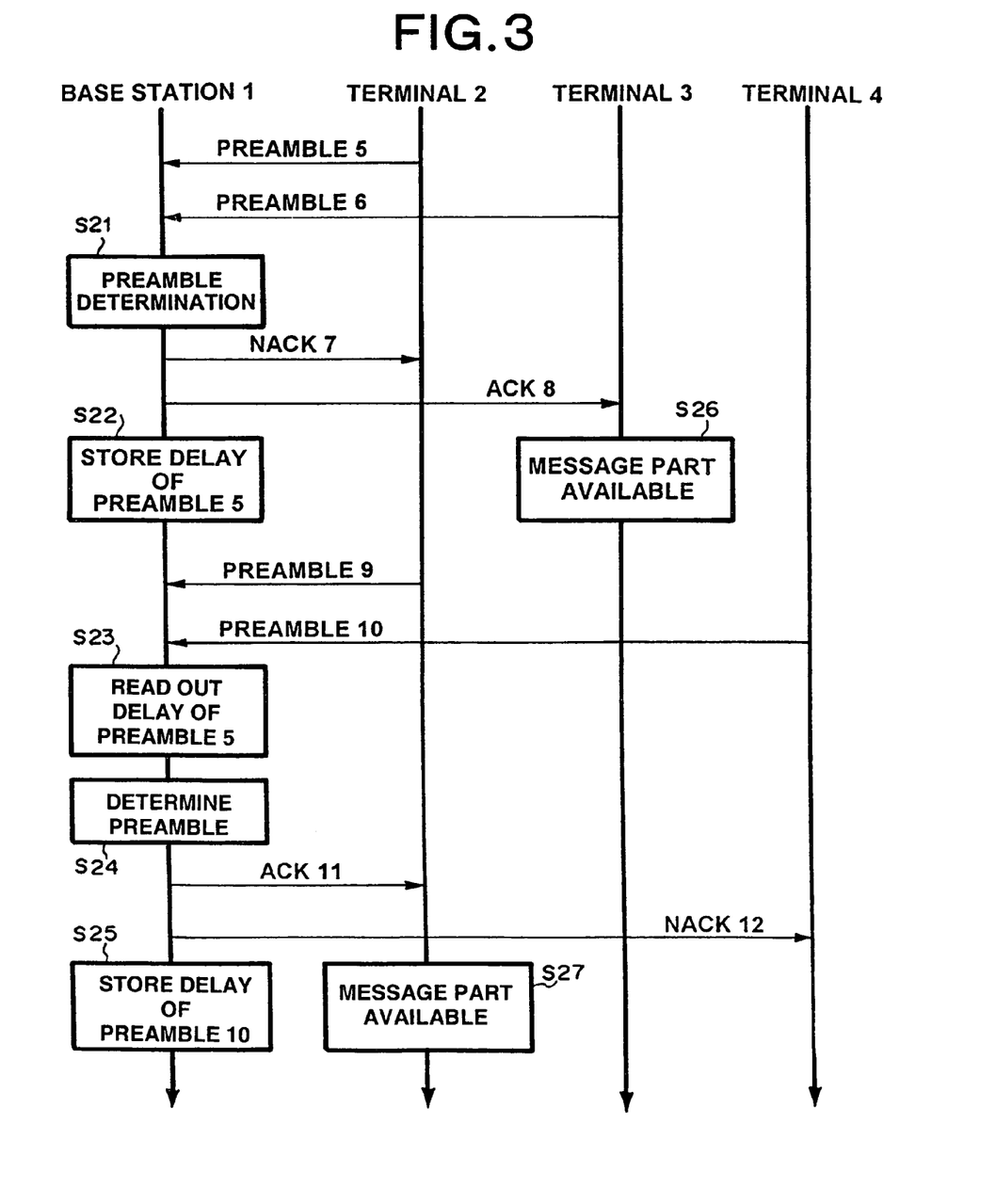
FIG. 3 is a sequence diagram for explaining the operation of the CDMA system of the present invention.

The operation of the embodiment of the present invention is explained, referring to the block diagram as shown in FIG. 1 and the flow chart as shown in FIG. 3.

It is assumed that preamble signals for requesting a message part are transmitted simultaneously by communication terminals 2 and 3. Transmitter/receiver of base station 1 receives preamble signals 5 and 6. However, transmitter/receiver 1 can not identify the communication terminals on the basis of the preambles. At step S21, transmitter/receiver of base station 1 determines whether it can allocate a message part or not for the communication terminals which transmitted the preambles. Only one communication terminal is qualified for the allocation, if there is only one free message part.

It is further assumed that the message part is allocated for communication terminal 3 which transmitted preamble signal 6, while the message part is not allocated for communication terminal 2 which transmitted preamble signal 5. In this case, ACK signal 8 for allowing to use the message part is transmitted for preamble signal 6. Therefore, communication terminal 3 can access the message part at step S26. On the other hand, NACK signal 7 for rejecting to use the message part is transmitted for preamble signal 5. In this case, the propagation delay of preamble signal 5 is stored at step S22. Thus, communication terminal 3 which is allowed to use the message part can transmit and receive digital signal of voice, picture, or data.

After transmitting the preambles as shown in FIG. 1, it is assumed that communication terminals 2 and 4 transmit preambles, respectively. It is also assumed that preamble signal 9 from communication terminal 2 is different from preamble signal 5 as shown in Fig. 1A. Thus, transmitter/receiver of base station 1 receives preamble signals 9 and 10. If only one message part is available, transmitter/receiver reads out the propagation delay of preamble signal 5 for which NACK signal is replied before at step S23 in order to compare the read-out propagation delay with the delay times of preamble signals 9 and 10.

Then, transmitter/receiver of base station 1 gives a priority to the preamble signal of which propagation delay is equal to or approximately equal to the propagation delay of preamble signal 5 at step S24. Thus, it is avoided that once rejected communication terminal is rejected repeatedly. Transmitter/receiver of base station 1 can identify the once rejected communication terminal, when the first delay is substantially equal to the second delay, even if there is any small difference between them.

Therefore, when the propagation delay of preamble signal 9 is substantially equal to the propagation delay of preamble 5, transmitter/receiver of base station 1 deems that a communication terminal transmitted preambles 9 and 5, and gives a priority to that mobile station. Accordingly, ACK signal 11 is transmitted for preamble 9, while NACK signal 12 is transmitted for preamble 10.

Finally, at step S25, transmitter/receiver of base station 1 deletes the stored propagation delay of preamble signal 5, while it stores newly the propagation delay of preamble 10 which is rejected. Thus, the above-explained steps are repeated.

Figure 4:
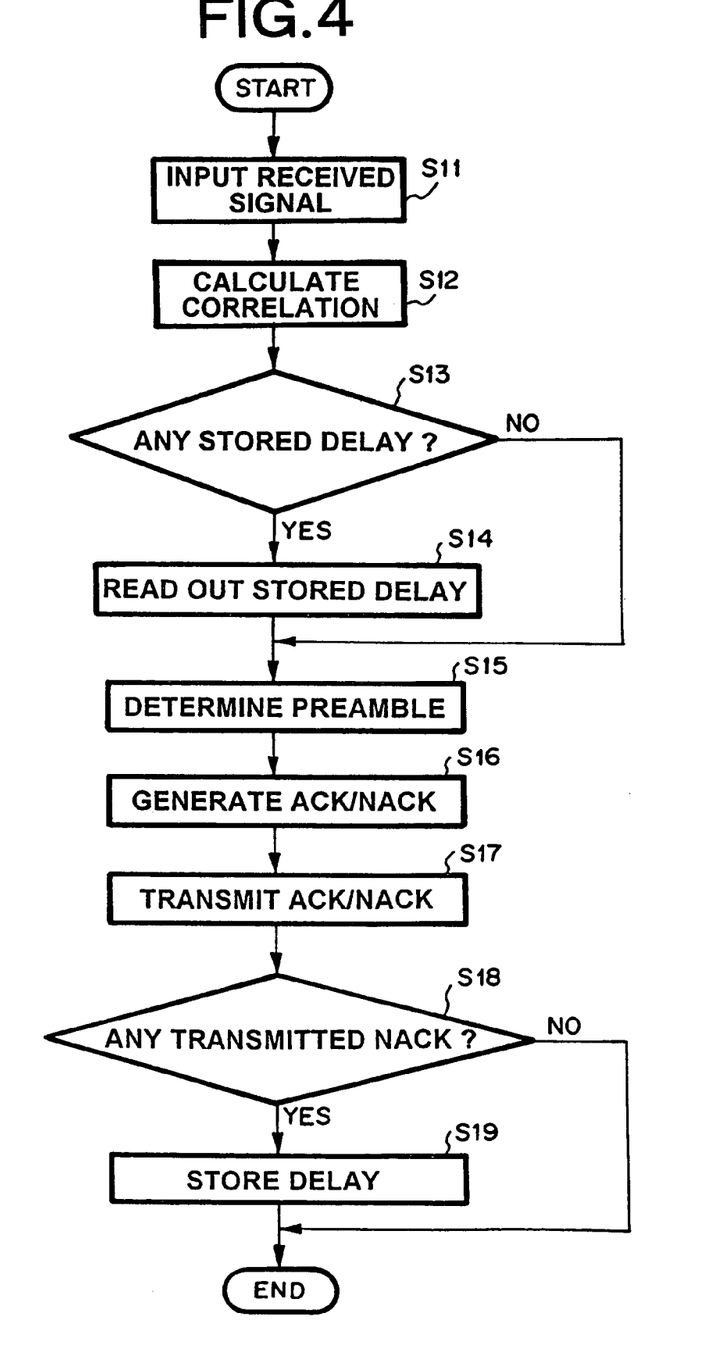
FIG. 4 is a flow chart for explaining the operation of the CDMA system of the present invention.

The operation of the channel access control unit as shown in FIG. 2 is explained, referring to the flow chart as shown in FIG. 4. At first at step S11, the demodulated base band signal is inputted into correlation unit 13. Correlation unit 13 calculates a time correlation between the base band signal and each of prescribed preamble signals. Then, the highest correlation value and its propagation delay are outputted toward preamble determination unit 14 at step S12.

A threshold is prescribed by preamble determination unit 14, thereby filtering out the correlation smaller than the threshold. Preamble determination unit 14 decides an order of priority for the correlations which is greater than the threshold on the basis of the correlation values and the propagation delays. Then, at step S13, the present propagation delay is compared with propagation delays of lower priority preamble signals stored in delay memory unit 16.

When the present propagation delay is substantially equal to the stored propagation delay of the lower priority preamble signals, preamble determination unit 14 gives higher priorities to the lower priority preamble signals. Then, at step S17, ACK signal and NACK signals are generated at step S16 and are outputted to the modulator.

Then, at step S18, it is checked whether NACK signal is transmitted. If NACK was transmitted, the propagation delay of the preamble signal for which NACK was transmitted is stored in delay memory unit 16 at step S19.

The stored propagation delay is used when the priority is decided afterward.

The priority may be decided on the basis of the propagation delay and an electric power of the received signal. In this case, ACK signal is transmitted toward the communication terminal of which electric power is the greatest, when the propagation delay is almost the same for the communication terminals, because the highest power terminal can executes a reliable communication. Further, the priority may also be decided on the basis of the propagation delay, the electric power, Eb/N0 ((energy/bit)/noise spectrum density) and data error rate of preamble signal. In this case, electric power, Eb/N0, and data error rate are stored in delay memory unit 16 for the rejected preamble signals for which NACK signals are transmitted.

The present invention is also applicable to a dispersed system without base station control, an in-house wireless LAN, spread spectrum system in general, a system wherein propagation delays can be measured, a wireless LAN such as WLL (wireless local loop), or Bluetooth system for small area propagation using small power.

The base station in the present invention may be a switching station connected with other base stations. The base station may be connected with a public telephone network.

What is claimed is:

1. A random access control method for a CDMA system comprising a base station and a plurality of terminals, which comprises the steps of:
   receiving at said base station preamble signals from said plurality of terminals;
   transmitting to said plurality of terminals signals for allowing random access or signals for rejecting said random access;
   storing propagation delay times for terminals, which received said signals for rejecting said random access; and
   assessing random access priority based, in part, on said stored propagation delay times.

2. The random access control method according to claim 1, wherein
   transmission data in a message part is transmitted by each of terminals, which received said signals for allowing said random access; and said transmission data is received by said base station.

3. The random access control method according to claim 1, wherein
   said base station gives a priority for random access to such a terminal that a present propagation delay time of said terminal is substantially equal to one of the stored propagation delay times.

4. The random access control method according to claim 1, wherein
   said base station:
   gives a priority for random access to one of said plurality of terminals on the basis of an electric power, a Eb/N0 ratio, or a data error rate in addition with said propagation delay time; and
   stores said electric power, said Eb/N0 ratio, or said data error rate in addition with said propagation delay times for said terminals, which received said signals for rejecting said random access.

5. A base station apparatus for controlling a plurality of terminals in a random access CDMA system, which comprises:
   a receiving unit for receiving preamble signals and transmission data from terminals to which random access is allowed;

a correlation unit for calculating correlations between an output from said receiving unit and a plurality of prescribed preamble signals;

a preamble signal determination unit for determining whether the base station transmits a signal for allowing said random access or a signal for rejecting said random access on the basis of said correlations and a propagation delay time of a preamble signal, and storing a delay time of preamble only when a signal for rejecting random access is transmitted; and a code generation unit for generating and transmitting said signal for allowing said random access or said signal for rejecting said random access.

6. A base station apparatus according to claim 5, which further comprises a delay memory unit for storing propagation delay times of terminals which received said signals for rejecting said random access.

7. A base station apparatus for controlling a plurality of terminals in a random access CDMA system, according to claim 5, wherein said base station:

transmits to one of said plurality of terminals said signal for allowing said random access;

stores propagation delay times of said terminals, which received said signal for rejecting said random access; and gives a priority to a terminal, which received said signal for rejecting said random access, and its propagation delay time is substantially equal to one of the stored propagation delay times.

8. A random access control method for a CDMA system comprising a base station and a plurality of terminals, which comprises the steps of:

receiving at said base station preamble signals from said plurality of terminals;

transmitting to said plurality of terminals signals for allowing random access or signals for rejecting said random access;

storing propagation delay times for terminals, which received said signals for rejecting said random access; and wherein said base station gives a priority to such a terminal that a present propagation delay time of said terminal is substantially equal to one of the stored propagation delay times.

9. The random access control method according to claim 8, wherein transmission data in a message part is transmitted by each of terminals, which received said signals for allowing said random access; and said transmission data is received by said base station.

10. A random access control method for a CDMA system comprising a base station and a plurality of terminals, which comprises the steps of:

receiving at said base station preamble signals from said plurality of terminals;

transmitting to said plurality of terminals signals for allowing random access or signals for rejecting said random access;

storing propagation delay times for terminals, which received said signals for rejecting said random access; and wherein said base station gives a priority to one of said plurality of terminals on the basis of an electric power, a Eb/N0 ratio, or a data error rate in addition with said propagation delay time, and stores said electric power, said Eb/N0 ratio, or said data error rate in addition with said propagation delay times for said terminals, which received said signals for rejecting said random access.

11. A base station apparatus for controlling a plurality of terminals in a random access CDMA system, which comprises:

a receiving unit for receiving preamble signals and transmission data from terminals to which random access is allowed;

a correlation unit for calculating correlations between an output from said receiving unit and a plurality of prescribed preamble signals;

a preamble signal determination unit for determining whether the base station transmits a signal for allowing said random access or a signal for rejecting said random access on the basis of said correlations and a propagation delay time of a preamble signal;

a code generation unit for generating and transmitting said signal for allowing said random access or said signal for rejecting said random access; and wherein said base station transmits to one of said plurality of terminals said signal for allowing said random access, stores propagation delay times of said terminals, which received said signal for rejecting said random access; and gives a priority to a terminal, which received said signal for rejecting said random access, and its propagation delay time is substantially equal to one of the stored propagation delay times.

12. A base station apparatus according to claim 11, which further comprises a delay memory unit for storing propagation delay times of terminals which received said signals for rejecting said random access.

* * * * *